UNITED STATES PATENT OFFICE.

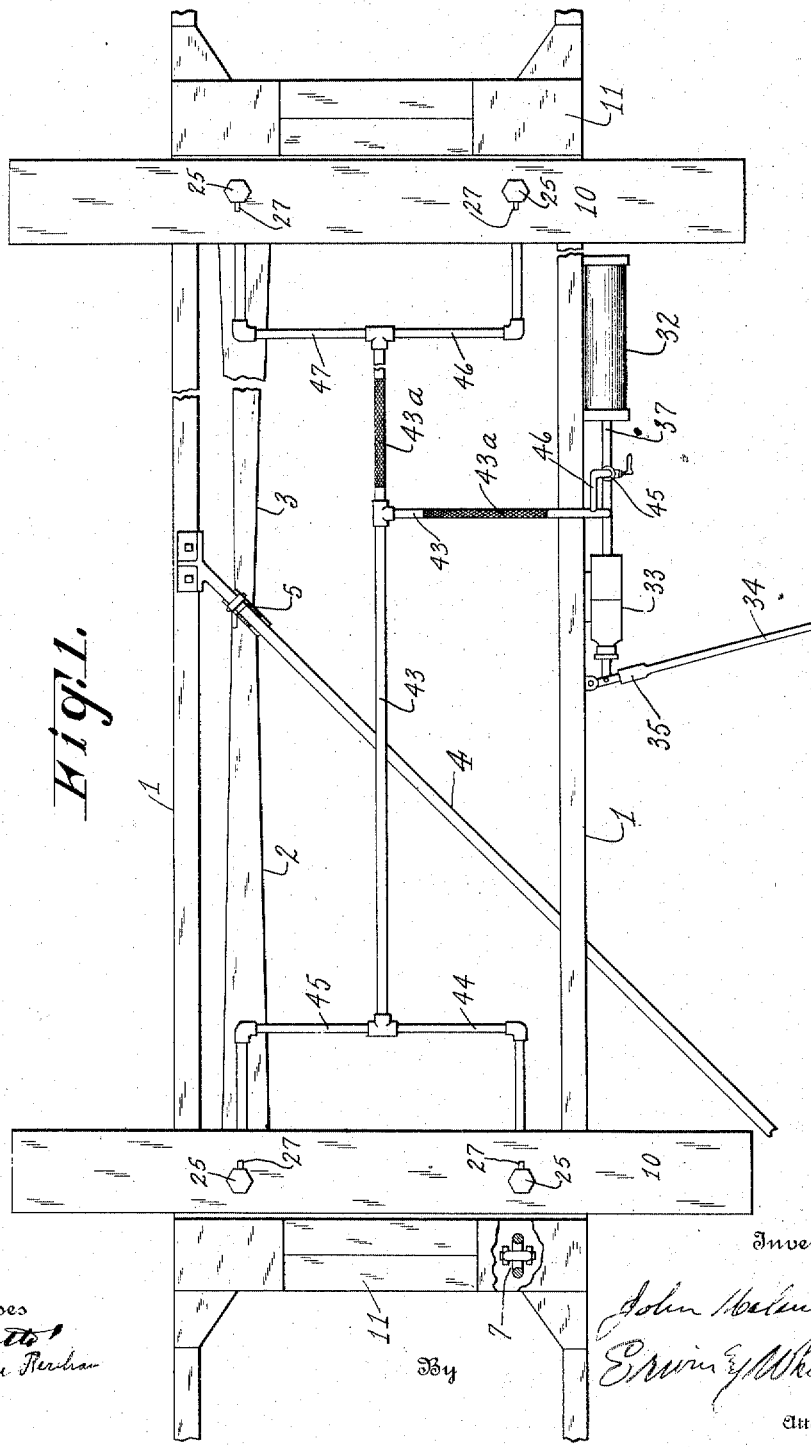

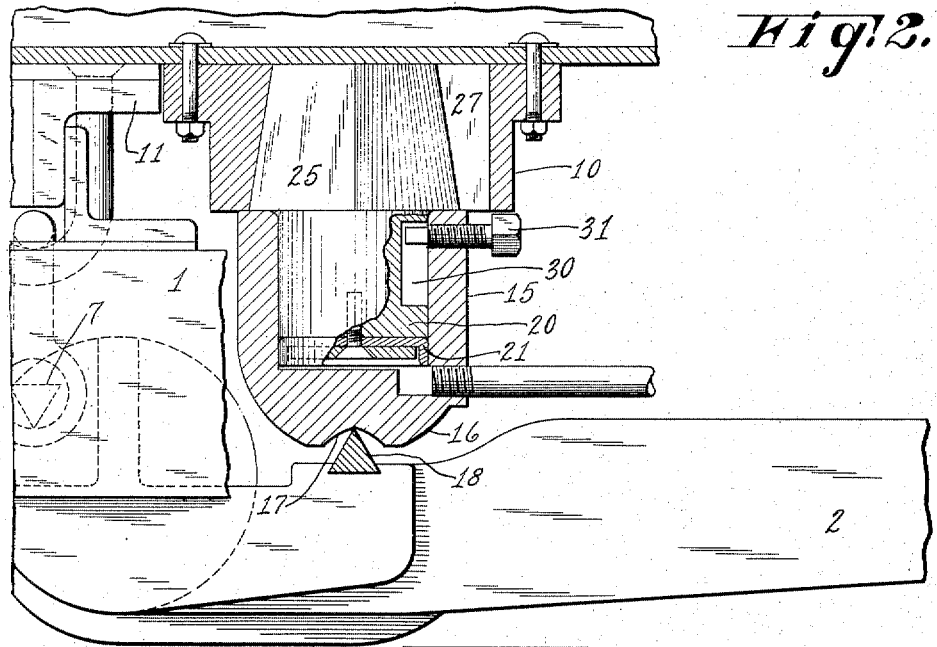
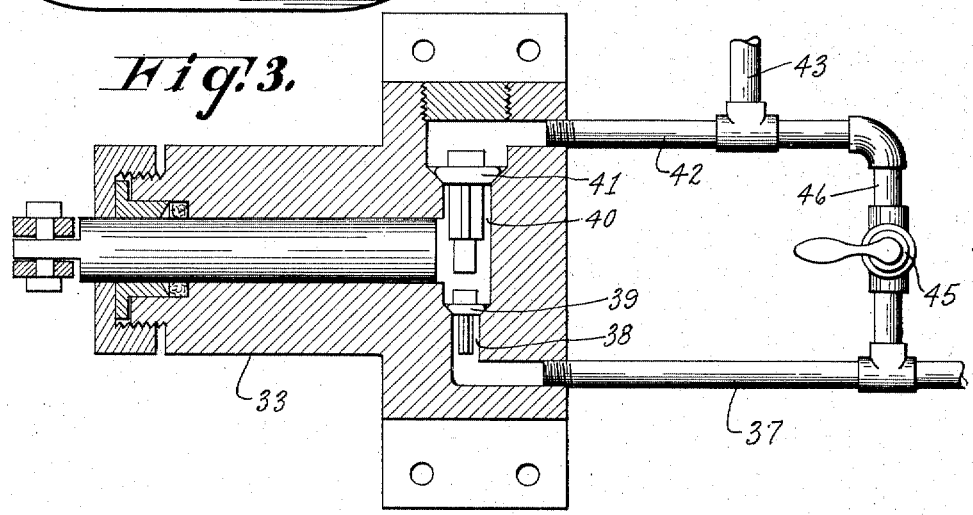

JOHN MALENSHECK, OF WEST ALLIS, WISCONSIN.

WEIGHING APPARATUS.

1,254,335.

Specification of Letters Patent.

Patented Jan. 22, 1918.

Application filed August 18, 1915. Serial No. 46,126.

*To all whom it may concern:*

Be it known that I, JOHN MALENSHECK, a citizen of the United States, residing at West Allis, county of Milwaukee, and State of Wisconsin, have invented new and useful Improvements in Weighing Apparatus, of which the following is a specification.

My invention relates to improvements in weighing apparatus of the general type shown and described in my former application, filed March 29, 1915, Serial No. 17592, in which the load carried by a vehicle, together with the box or container which supports it, may be temporarily lifted from the ordinary vehicle bolsters and supported upon a set of levers operatively connected with weight indicating apparatus, such for example as a counterbalanced scale beam.

The object of the present invention is to provide improved means for shifting the load from the ordinary bolsters to the auxiliary supports and weighing levers. More specifically, the object is to provide hydraulic means for thus shifting the load.

In the drawings—

Figure 1 is a plan view of a portion of a vehicle frame, showing the auxiliary load-shifting and supporting means.

Fig. 2 is a detail sectional view of one of the hydraulic lifting jacks in its relation to the auxiliary bolster bar and the supporting bearing carried by one of the main levers.

Fig. 3 is a detail sectional view of the pumping apparatus and a portion of the associated pipe connections, the latter being shown in full.

Like parts are identified by the same reference characters throughout the several views.

1 is a portion of the main frame of a vehicle. 2 and 3 are the main levers of the weighing apparatus and 4 is a diagonal motion transmitting lever, whereby the movement of the main levers 2 and 3 is transmitted to the scale beam or beams, lever 4 being connected with the levers 2 and 3 at 5. The levers 2 and 3 are pivoted to the main frame near the respective ends of the latter, as indicated at 7 in Fig. 1, and when it is desired to ascertain the weight of the load, the auxiliary bolsters 10 are lifted to remove the weight from the main bolsters 11 and said auxiliary bolsters are supported from the levers 2 and 3 respectively near the pivotal connections 7, whereby the inner ends of said levers 2 and 3 are pressed downwardly. This pressure is transmitted through the diagonal bar 4 and indicated upon the scale beam (not shown).

All of the above mentioned parts are fully shown and described in said former application and as their structural features are not claimed herein, further detailed description is deemed unnecessary.

In said former application, screws and gearing are employed to lift the auxiliary bolsters 10 when it is desired to support the load from the scale beams for the purpose of ascertaining its weight. In the structure shown in the present application, however, these screws and gear wheels are dispensed with and the auxiliary bolsters 10 are supported by a set of hydraulic jacks. Each jack includes a cylinder 15, having its lower end thickened, as indicated at 16, and provided with a bearing socket 17 adapted to receive V-shaped bearing projections 18 carried by the supporting lever 2 (or 3). A plunger 20 is located within the cylinder and is preferably provided with a piston head 21 of the ordinary cup leather type. The upper end of the cylinder 15 is open and the upper end of the plunger is provided with a projecting member or head 25 which is preferably larger in diameter than the plunger and is tapered upwardly, of truncated-pyramidal shape. This member is fitted to a correspondingly shaped socket in the auxiliary bolster 10, and while the member 25 is angular or polygonal in cross section I preferably employ in addition thereto, a key 27 to prevent member 25 from rotating in case the corners thereof should become worn with continued use. The plunger 20 is provided with a channel 30 in one side thereof adapted to receive a stop pin or screw 31 to limit the vertical movements of the plunger. The enlarged head or member 25 of the plunger is also adapted to limit the downward movement of the latter by striking upon the upper end of the cylinder 15.

In the construction shown, one hydraulic jack is employed near each end of each auxiliary bolster bar 10. A supply of liquid for operating the jacks is stored in a tank 32 connected with the main frame 1 and this liquid is delivered to the jacks by means of a pump 33, the piston of which is operated by a suitable handle or lever 34, which is preferably made detachable at 35, so that the outer end of the lever or handle may be removed when not in use.

Fig. 3 shows the connections of the pump. 37 is a suction pipe leading to the interior of the pump cylinder through a port 38 provided with a check valve 39. 40 is the outlet port provided with a check valve 41 past which the liquid is forced through a pipe 42 into a pipe 43 having suitable branches 44, 45, 46 and 47 leading to the respective jacks.

When the liquid is forced into the jack cylinders 15, the plungers 20 will of course be lifted, thereby lifting the bolster bars 10 and raising the load from the ordinary or main bolsters. The weight of the load will then be supported upon the levers 2 and 3, and its weight can be ascertained by proper adjustment of the scale weights in the ordinary manner. After this has been done, the liquid in the jacks may be permitted to return to the storage tank 32 by opening a valve 45 located in the by-pass 46, whereby the liquid is permitted to flow from pipe 43 to pipe 37 and thence into the tank 32.

In the construction above described, the auxiliary bolsters 10 are preferably bolted directly to the wagon box, in which case the construction is such that the plunger heads 25 will preferably move downwardly to a sufficient extent to loosen in the bolster sockets when the liquid is exhausted from the cylinders. While I have shown and described my invention as including the use of a liquid container from which liquid is delivered to the jacks by means of a pump, it will of course be understood that any fluid may be employed to operate the jacks, and if desired, the pump may be utilized to pump air into the jacks, but I preferably employ a liquid for the reason that it is much easier to avoid leakage and the liquid being substantially incompressible, the operation of lifting the load may be much more easily and quickly performed.

While I have described my invention with particular reference to vehicles, it will be understood that it may be used in any relation where a load supporting member is raised to lift and support the load from the weighing mechanism while it is being weighed. Where applied to vehicles, flexible pipe sections 43ª, preferably composed of steel tubing, are preferably employed to avoid injury to the pipe systems.

I claim—

1. In a weighing apparatus for vehicles, the combination with a set of load supporting levers, and means for operatively connecting the same with weight indicating apparatus, of a set of auxiliary bolsters and hydraulic means for temporarily supporting a load carried by the vehicle from said levers, said hydraulic load supporting means including a set of cylinders having plungers therein having enlarged truncated-pyramidal shaped heads arranged within correspondingly shaped sockets with which the bolsters are provided, said plungers having side channels, adjustable stop pins carried by said cylinders projecting into said channels, a reservoir carried by the vehicle and a pump for forcing liquid from the reservoir to said cylinders.

2. The combination with a vehicle-frame, of a set of levers pivotally connected therewith, a set of hydraulic cylinders carried by said levers, upright plungers within said cylinders, said plungers having enlarged heads polygonal in cross-section, a set of load-supporting bolsters adapted to be lifted by said plungers and to load-supporting position, and having downwardly opening upwardly tapered sockets within which the said heads are fitted, a liquid-container carried by said frame, a pump adapted to deliver liquid from the container to said cylinders, together with a valved return-duct adapted to permit liquid to flow from the cylinders back to the container, and retaining keys between said heads and cylinders, said heads being seated upon the tops of said cylinders when the plungers are at the downward limit of their movement.

3. A weighing wagon comprising a wagon frame, a body normally resting thereon, scale mechanism carried by the frame and including load supporting levers each fulcrumed on the frame, a hydraulic jack between each lever and said body, and each comprising a cylinder and plunger, relatively movable and one engaging the body and the other having pivotal connection with the lever, the arrangement being such that the jacks together are adapted to transfer the entire weight of the body from the frame directly through said jacks to the scale mechanism, and hydraulic connections for operating the jacks.

4. In a weighing vehicle the combination with a vehicle frame, of a set of load supporting levers carried thereby, a vehicle body having a set of auxiliary bolsters, hydraulic means for temporarily supporting the body and its load from said levers, said hydraulic means including a set of cylinders each having a plunger therein, said plungers having enlarged heads with upwardly converging contact faces, and said bolsters having sockets shaped to correspond with and adapted to receive said heads.

In testimony whereof I affix my signature in the presence of two witnesses.

JOHN MALENSHECK

Witnesses:
 LEVERETT C. WHEELER,
 IRMA D. BREMER.